United States Patent

Heap et al.

Patent Number: 5,805,102
Date of Patent: Sep. 8, 1998

[54] APPARATUS FOR DIRECTING A MOBILE CRAFT TO A RENDEVOUS WITH ANOTHER MOBILE CRAFT

[75] Inventors: Eric Heap, Camberley; Peter John Herbert, Farnham, both of England

[73] Assignee: The Secretary of State for Defence in Her Britannic Majesty's Government of the United Kingdom of Great Britain and Northern Ireland

[21] Appl. No.: 628,190

[22] Filed: Oct. 31, 1975

[51] Int. Cl.$^6$ ........................................... G01S 13/72
[52] U.S. Cl. ............................................. 342/62; 244/3.14
[58] Field of Search ................... 244/3.15; 235/150.26, 235/150.27, 61.5 S; 342/62, 63

[56] References Cited

U.S. PATENT DOCUMENTS

| | | | |
|---|---|---|---|
| 2,979,262 | 4/1961 | Penley et al. | 235/150.26 |
| 3,034,228 | 5/1962 | Giloth | 235/150.27 |
| 3,078,041 | 2/1963 | Bomberger | 235/150.26 |
| 3,260,478 | 7/1966 | Welti | 244/3.14 |
| 3,527,429 | 9/1970 | Hawes, Jr. et al. | 244/3.14 |
| 3,743,215 | 7/1973 | Harris | 244/3.14 |

*Primary Examiner*—John B. Sotomayor
*Attorney, Agent, or Firm*—Freddie M. Bush

[57] ABSTRACT

Tracking means for establishing a line-of-sight between a control point towards which the second craft is being guided and tracking the line-of-sight to follow the second craft and deriving a signal $\dot{\theta}_a$ representing the rate of rotation of the line-of-sight about the control point; monitoring means for deriving a signal e representing the displacement of the first craft from the line-of-sight, a signal representing the range $R_m$ from the control point to the first craft and a signal representing the rate of of change $\dot{R}_m$ of the range $R_m$; ranging means for deriving a signal representing the range $R_t$ from the control point to the second craft and a signal representing the rate of change $\dot{R}_t$ of the range $R_t$; a computer for deriving representations of $\dot{\theta}_c$, $\ddot{\theta}_c$ and $\dddot{\theta}_c$ which satisfy the equation $$\dddot{\theta}_c = -2\dot{\theta}_c^3 - 3\ddot{\theta}_c(\dot{R}_t/R_t)$$

where the difference $\dot{\theta}_c - \dot{\theta}_a$ is minimised; control means for deriving from the representations provided by the computer a control signal representing $f(e) + R_m\ddot{\theta}_c - 2\dot{R}_m\dot{\theta}_c$ where $f(e)$ is a function of e; and, guidance means for causing the first craft to develop an acceleration transverse to the line-of-sight, of a magnitude dependent on the control signal.

3 Claims, 1 Drawing Sheet

APPARATUS FOR DIRECTING A MOBILE CRAFT TO A RENDEVOUS WITH ANOTHER MOBILE CRAFT

FIELD OF THE INVENTION

The present invention relates to apparatus for guiding a first mobile craft to a meeting with a second mobile craft. In this specification the term 'mobile craft' should be interpreted widely so as to include any kind of aircraft, spacecraft, or guided missle. The apparatus may for instance be used to guide a defensive missle to intercept an attacking missle, or to guide a space craft towards a space station or mother craft.

BACKGROUND OF THE INVENTION

It is known that a defensive missle may be guided towards an attacking craft by control signals derived from measurements of a line-of-sight from a control point to the attacking craft. To avoid confusion the attacking craft will hereinafter be called the target. The line-of-sight may be established by visible light, infra-red light, radar signals, or any other form of radiation which can be projected along a measureable straight-line axis which will be moved either manually or automatically so that it always points towards the target, by apparatus incorporating means for deriving signals $\dot{\theta}_a$ representing the rate of rotation $\theta_a$ of the line-of-sight. It is known also to derive signals representing the displacement e of the missle from the line-of-sight, the range $R_m$ from the control point to the missle, and its rate of change $\dot{R}_m$, and to derive from these signals a control signal representing the quantity $f(e)+R_m\ddot{\theta}_c+2\dot{R}_m\dot{\theta}_c$ where f(e) is a predetermined function of e, $\dot{\theta}_c$ is derived from $\dot{\theta}_a$ by a simple smoothing circuit and the term $\ddot{\theta}_c$ (which represents the rate of change of $\dot{\theta}_c$) is derived from $\dot{\theta}_c$ by a simple differentiating circuit. This control signal is used to govern an acceleration applied to the missle transverse to the line-of-sight, so as to increase the accuracy of the rendezvous or the chance of meeting with the target.

It is also known that mobile craft are often guided towards a specified destination by a technique called proportional navigation in which the flight direction of the craft is made to rotate at a rate k times the rate of rotation of a sight-line from the craft to its destination where k has a predetermined value. In one form of proportional navigation the craft follows a circular arc to its destination.

It is an object of the invention to provide apparatus for guiding a first mobile craft towards a rendezvous or meeting with a second mobile craft which improves the above-mentioned smoothing and differentiation by making use of the assumption or knowledge that the second craft is being guided along a circular arc. This includes as a special case the case of a craft being guided by a system wherein k=2 along a circular arc towards a control point.

BRIEF DESCRIPTION OF THE INVENTION

According to the present invention there is provided apparatus for directing a first mobile craft to a rendezvous with a second mobile craft which is being guided along a circular arcuate path, towards a control point, comprising; tracking means for establishing a line-of-sight between the control point and the second mobile craft and deriving a signal $\dot{\theta}_a$ representing the rate of rotation $\dot{\theta}$ of the said line-of-sight about the control point; monitoring means for deriving a displacement signal representing the displacement e of the first mobile craft from the said line-of-sight, a first range signal representing the range $R_m$ from the control point to the first mobile craft, and a first range rate signal representing the rate of change $\dot{R}_m$ of the range $R_m$; ranging means for deriving a second range signal representing the range $R_t$ from the control point to the second mobile craft, and a second range rate signal representing the rate of change $\dot{R}_t$ of the range $R_t$; computing means responsive to the signal representing $\dot{\theta}_a$ for deriving representations of quantities $\dot{\theta}_c$, $\ddot{\theta}_c$, $\dddot{\theta}_c$ tending to become consistent with the equation $\dddot{\theta}_c-2\dot{\theta}_c^3-3\ddot{\theta}_c(\dot{R}_t/R_t)$ so that $\dot{\theta}_c=\int\ddot{\theta}_c dt$, $\ddot{\theta}_c\int\dddot{\theta}_c dt$ and the difference $\dot{\theta}_c-\dot{\theta}_a$ is minimized, the sum $\int$ dt indicating integration with respect to time; control means for deriving from the aforesaid representations a control signal representing a quantity $f(e)+R_m\ddot{\theta}_c=2\dot{R}_m\dot{\theta}_c$ wherein f(e) is a predetermined function of e; and guidance means for causing the said first mobile craft to develop an acceleration transverse to the said line-of-sight, of a magnitude dependent on the said control signal.

The computing means may be a stochastic controller operating according to the novel equation which relates the quantities $\dot{\theta}_c$, $\ddot{\theta}_c$, $\dddot{\theta}_c$ as hereinbefore specified.

The first mobile craft may be a missile or rocket, in which case the signals representing $R_m$ and $\dot{R}_m$ may be derived from a measurement of the time elapsed since the missile or rocket was launched and a knowledge of the characteristics of its type assuming that its performance will be typical of its kind. The displacement e must be measured; this may be done by various available known techniques.

BRIEF DESCRIPTION OF THE DRAWINGS

An embodiment of the invention will now be described by way of example only, with reference to the accompanying drawings of which.

DETAILED DESCRIPTION OF THE INVENTION

Figure 1:
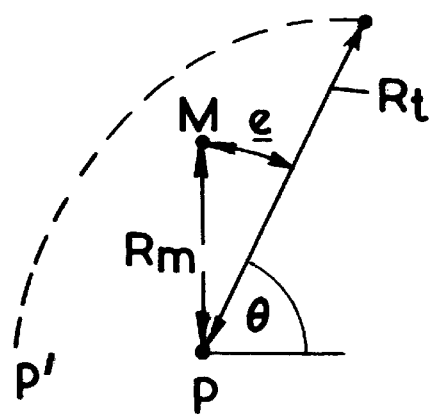
FIG. 1 is a sketch showing the geometrical relationship of some of the quantities involved in a guidance operation.

In FIG. 1, T represents the instantaneous position of a mobile craft which is being guided along a circular arc towards a point $P^1$ which may or may not coincide with a control point P. M represents the instantaneous position of another mobile craft which has been launched from P and is to be guided to a meeting with the craft now at T.

At the control point P, the angle between the sight line PT and a stable reference direction is represented by the symbol $\dot{\theta}$. The rate of rotation $\dot{\theta}$ of the sight line PT (which is the rate of change of $\theta$) is measured. The instantaneous range of the craft now at M from the control point P (ie the distance MP) is represented by the symbol $R_m$ and the displacement of the craft M from the sight line PT is represented by the symbol e. In practice e may be deduced from a measurement of the angle MPT and a knowledge of the range $R_m$. In this situation it can be shown that the derivatives $\dot{\theta}$, $\ddot{\theta}$ and $\dddot{\theta}$ should approximately satisfy the equation $\dddot{\theta}=-2\dot{\theta}^3-3\ddot{\theta}($ $\dot{R}_t/R_t)$ where $R_t$ is the instantaneous range of the craft at T from the control point P and $\dot{R}_t$ is its rate of change.

Figure 2:
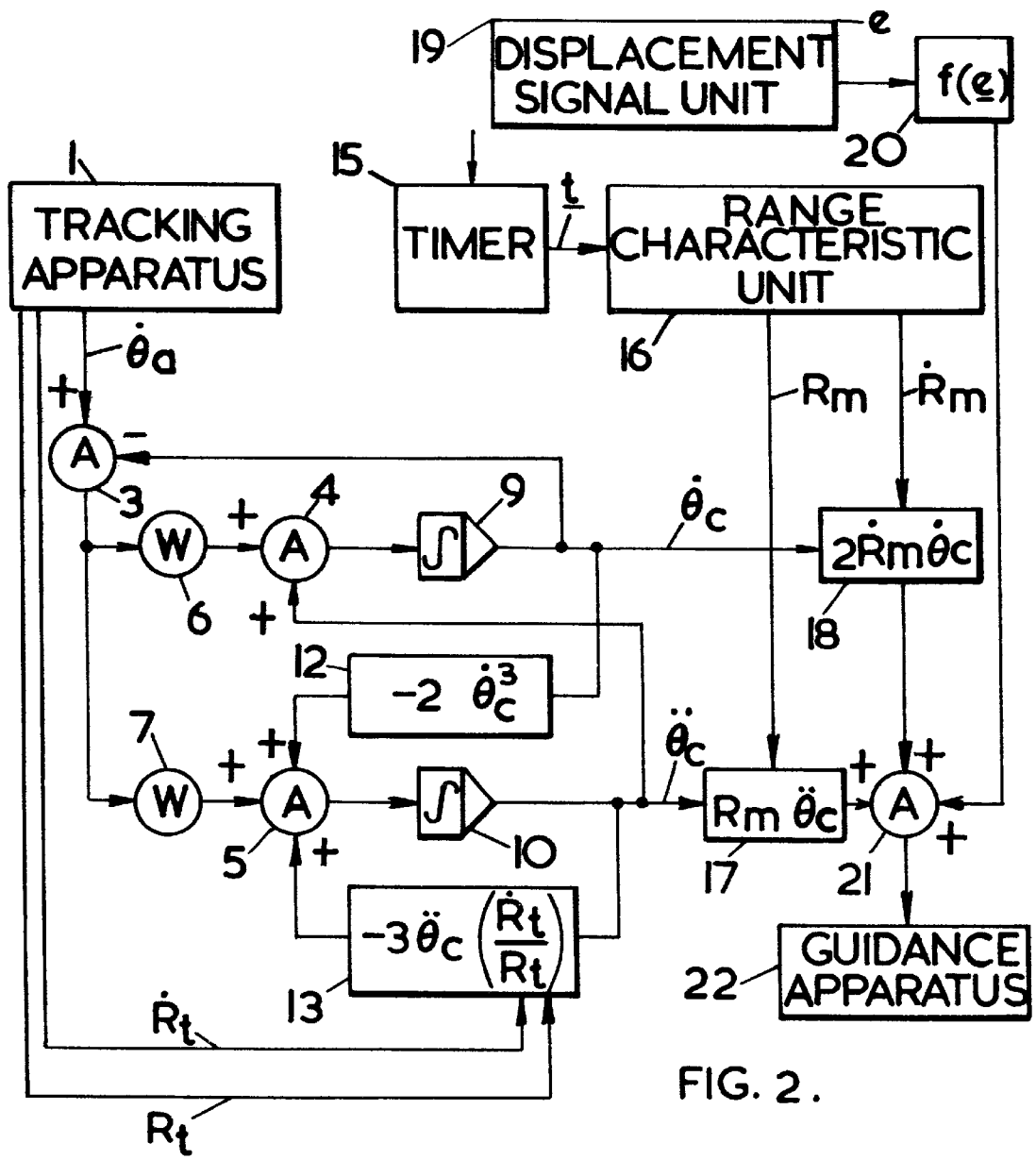
FIG. 2 is a schematic block diagram of a general form of guidance apparatus.

FIG. 2. shows apparatus which utilises this fact. In the following description the symbol $\theta$ is used with a suffix a to indicate an actual measured value, and with a suffix c to indicate a calculated or estimated value. A tracking apparatus 1 provides signals representing $\dot{\theta}_a$, $R_t$ and $\dot{R}_t$ which are applied to analogue computing apparatus arranged as a stochastic controller. This comprises analogue signal combiners 3, 4 and 5, analogue signal weighting units 6 and 7, integrators 9 and 10, and analogue signal computing networks 12 and 13 arranged as shown. The signs + and − adjacent to the inputs of the combiner 3 indicate that it derives a signal representing the difference $(\dot{\theta}_a-\dot{\theta}_c)$ of the quantities represented by the signals applied to it. The other combiners 4 and 5 combine their input signals additively. The computing network 12 is connected to receive an input representing $\dot{\theta}_c$ and to derive an output representing $-2\dot{\theta}_c^3$. The computing network 13 is connected to receive inputs representing $\ddot{\theta}_c$, $\dot{R}_t$ and $R_t$ and to derive an output representing the function $-3\ddot{\theta}_c(\dot{R}_t/R_t)$. These units 3 to 14 are each constructed according to conventional techniques of the analogue computing art. The weighting units 6 and 7 are adjusted, following the techniques described for instance in 'Applied Optimal Control' by A E Bryson and Y C Ho, (Blaisdell Publishing Co 1969) at p 425 et seq so that the whole combination (units 3 to 14 ) will operate as a stochastic controller to derive signals which tend to become consistent with the equations $$\ddot{\theta}_c = -2\dot{\theta}_c^3 - 3\ddot{\theta}_c(\dot{R}_t/R_t)$$

$$\dot{\theta}_c = \int \ddot{\theta}_c dt$$

$$\ddot{\theta}_c = \int \dddot{\theta}_c dt$$

and minimise the difference $\dot{\theta}_a - \dot{\theta}_c$ (that is to say also making $\dot{\theta}_c$ follow $\dot{\theta}_a$). This provides a signal representing $\dot{\theta}_c$ which may be taken as a good approximation to $\dot{\theta}_a$, and is derived by a process which improves the differentiation and can be made satisfactorily stable and comparatively free from noise.

A timer 15 is connected to receive a launch timing signal from launching apparatus (not shown) and to provide a signal representing t, the time elapsed since launching of the craft M in FIG. 1. A range characteristic unit 16 receives the t signal and derives signals representing $f_1(t)=R_m$ and $f_2(t)=\dot{R}_m$ according to stored characteristics relevant to the type of the the M; the elapsed time t is represented digitally and the unit 16 is a digital computer store loaded with values of $f_1(t)$ and $f_2(t)$ in addresses which are values of t. The unit 16 converts the stored values to analogue form. An analogue multiplier 17 is connected to receive the $R_m$ signal from unit 16 and the $\ddot{\theta}_c$ signal from the integrator 10 and to form a representation of the product $R_m\ddot{\theta}_c$. Another analogue multiplier 18 is connected to receive the $\dot{R}_m$ signal from unit 16 and the $\dot{\theta}_c$ signal from the integrator 9 and to form a representation of the product $2\dot{R}_m\dot{\theta}_c$. A displacement signal unit 19 derives a signal representing a and an analogue computing network 20 derives a representation of a function f(e); these units and the function f(e) are arrangements well known in the guidance art. Outputs from the units 17, 18 and 20 are additively combined in an analogue combiner 21 to form a control signal which is applied to conventional guidance apparatus 22, which will include means for sending control signals to the craft M.

Various modifications are possible. Clearly various parts or all of the calculations could be done by digital rather than analogue techniques, and the tracking apparatus may be constructed to provide a signal representing the quotient $\dot{R}_t/R_t$ instead of seperate representations of $\dot{R}_t$ and $R_t$.

What I claim is:

1. Apparatus for directing a first mobile craft to a rendezvous with a second mobile craft which is being guided along a circular arcuate path, comprising; tracking means for establishing a line-of-sight between the control point and the second mobile craft and tracking the said line-of-sight to follow the said second mobile craft and deriving a signal $\dot{\theta}_a$ representing the rate of rotation $\dot{\theta}$ of the said line-of-sight about the control point; monitoring means for deriving a displacement signal representing the displacement e of the first mobile craft from the said line-of-sight, a first range signal representing the range $R_m$ from the control point to the first mobile craft, and a first range rate signal representing the rate of change $\dot{R}_m$ of the range $R_m$; ranging means for deriving a second range signal representing the range $R_t$ from the control point to the second mobile craft, and a second range rate signal representing the rate of change $\dot{R}_t$ of the range $R_t$; computing means responsive to the signal representing $\dot{\theta}_a$ for deriving representation of quantities $\dot{\theta}_c$, $\ddot{\theta}_c$, $\dddot{\theta}_c$ tending to become consistent with the equation $$\dddot{\theta}_c = -2\dot{\theta}_c^3 - 3\ddot{\theta}_c(\dot{R}_t/R_t)$$

so that $\dot{\theta}_c = \int \ddot{\theta}_c dt$, $\ddot{\theta}_c = \int \dddot{\theta} dt$ and the difference $\dot{\theta}_c - \dot{\theta}_a$ is minimised, the symbol $\int dt$ indicating integration with respect to time; control means for deriving from the aforesaid representation a control signal representing a quantity $f(e) + R_m\ddot{\theta}_c + 2\dot{r}_m\dot{\theta}_c$ wherein f(e) is a predetermined function of e; and, guidance means for causing the said first mobile craft to develop an acceleration transverse to the said line-of-sight of a magnitude dependent on the said control signal.

2. Apparatus as claimed in claim 1 wherein the computing means is a stochastic controller operating according to the novel equation as hereinbefore set out in claim 1.

3. Apparatus as claimed in claim 1 specifically for use in a rocket or missle wherein the monitoring means is arranged to derive the signals $R_m$ and $\dot{R}_m$ from a measurement of the time elapsed since the missle or rocket was launched and from parameters stored in the apparatus representing characteristics of that type of missle or rockets performance.

* * * * *